(12) United States Patent
Qiu

(10) Patent No.: US 10,932,548 B2
(45) Date of Patent: Mar. 2, 2021

(54) WATER STORAGE TANK AND HOUSEHOLD WATER PURIFIER HAVING SAME

(71) Applicant: 3M INNOVATIVE PROPERTIES COMPANY, St. Paul, MN (US)

(72) Inventor: Biyong Qiu, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 22 days.

(21) Appl. No.: 16/476,615

(22) PCT Filed: Jan. 15, 2018

(86) PCT No.: PCT/US2018/013735
§ 371 (c)(1),
(2) Date: Jul. 9, 2019

(87) PCT Pub. No.: WO2018/136365
PCT Pub. Date: Jul. 26, 2018

(65) Prior Publication Data
US 2019/0365083 A1    Dec. 5, 2019

(30) Foreign Application Priority Data
Jan. 17, 2017 (CN) .......................... 201710033352.0

(51) Int. Cl.
*A45F 3/18*         (2006.01)
*B01D 61/02*        (2006.01)
(Continued)

(52) U.S. Cl.
CPC .............. *A45F 3/18* (2013.01); *B01D 61/025* (2013.01); *B01D 61/10* (2013.01); *C02F 1/441* (2013.01);
(Continued)

(58) Field of Classification Search
CPC ....... B65B 1/18; B65B 67/12; B65B 67/1233; B65D 11/10; A45F 3/18; B01D 61/025;
(Continued)

(56) References Cited

U.S. PATENT DOCUMENTS 2,480,558 A * 8/1949 De Kiss .................... F15B 1/10
138/30
4,690,299 A * 9/1987 Cannon .................. B65D 7/045
220/4.12
(Continued)

FOREIGN PATENT DOCUMENTS

CN    203667272    6/2014
CN    103016727    5/2015
(Continued)

OTHER PUBLICATIONS

International Search Report for PCT International Application No. PCT/US2018/013735, dated May 2, 2018, 3 pages.

*Primary Examiner* — Robert J Hicks
(74) *Attorney, Agent, or Firm* — Scott A. Baum (57) ABSTRACT

A water storage tank is provided with a water storage bag for storing finished water and a space for accommodating squeezed water outside of the water storage bag. The water storage tank enables a rapid introduction of squeezed water by having a flow guiding groove connected in communication with the space for accommodating squeezed water. A hollow tube extending into the water storage bag is arranged to prevent distortion of the water storage bag, so as to completely squeeze the finished water out of the bag. A cylindrical middle part and two ellipsoidal or hemispherical ends of the water storage tank can improve the stress bearing performance of the water storage tank. A household water purifier using the water storage tank is also described.

12 Claims, 6 Drawing Sheets

(51) Int. Cl.
*B01D 61/10* (2006.01)
*C02F 1/44* (2006.01)

(52) U.S. Cl.
CPC .... *B01D 2313/50* (2013.01); *C02F 2201/002* (2013.01)

(58) Field of Classification Search
CPC ...... B01D 61/022; B01D 61/02; B01D 61/10; C02F 1/441
USPC ....... 220/4.24, 4.21, 4.12, 723, 720; 141/68, 141/314, 315
See application file for complete search history.

(56) References Cited

U.S. PATENT DOCUMENTS

| | | |
|---|---|---|
| 4,997,553 A | 3/1991 | Clack |
| 7,726,511 B2 | 6/2010 | Beall |

FOREIGN PATENT DOCUMENTS

| | | |
|---|---|---|
| CN | 204533502 | 8/2015 |
| GB | 2 169 869 A | 7/1986 |
| GB | 2 270 124 A | 3/1994 |
| KR | 10-2014-0085826 | 7/2014 |
| KR | 10-2015-0073653 | 7/2015 |
| KR | 10-2016-0060896 | 5/2016 |
| KR | 10-2016-0115576 | 10/2016 |
| WO | WO 2007-025263 | 3/2007 |
| WO | WO 2012/051496 | 4/2012 |

\* cited by examiner

WATER STORAGE TANK AND HOUSEHOLD WATER PURIFIER HAVING SAME

CROSS REFERENCE TO RELATED APPLICATIONS

This application is a national stage filing under 35 U.S.C. 371 of PCT/US2018/013735, filed Jan. 15, 2018, which claims the benefit of Chinese Patent Application No. 201710033352.0, filed Jan. 17, 2017, the disclosures of which are incorporated by reference in their entirety herein.

TECHNICAL FIELD

The present invention belongs to the technical field of liquid purification, and more particularly to a water storage tank and a household water purifier including the same.

BACKGROUND

With more emphasis users are putting onto the drinking water safety, having household water purifiers installed is increasingly popular.

Due to the difference in water source conditions, the supplied water quality of cities in different areas are different. For example, the average water hardness in the northern China is higher than that in the central and eastern China, which in turn is higher than that in the southern China. In general, the phenomenon of having scale deposits formed after heating drinking water is relatively common in areas with high water hardness. In order to solve the problem of scale deposits, a majority of water purifier manufacturers use a filtering technique with a reverse osmosis membrane to manufacture a reverse osmosis water purifier.

A small reverse osmosis water purifier provides a low pure water flow from the membrane element (50 to 200 gallons/day); and a direct use from the small water purifier cannot meet the user's requirement for water use. A water storage tank is therefore used to store pure water; and pure water flowing out of the tap is actually from the water storage tank.

The water storage tank has two chambers partitioned with an elastic separator therein, where one chamber is configured to storage pure water and the other chamber contains compressed air at a certain pressure; when a user turns on the tap, pure water in the chamber storing purified water can then be squeezed out of the tap.

When water in the water storage tank is full, the volume of compressed air is at its minimum and the pressure is at its maximum; and the flow rate of output water is at its maximum the second the user turns on the tap. However, when pure water in the water storage tank is reduced and the volume of compressed air increases, the pressure becomes increasingly lower and the flow rate of water output from the tap also becomes increasingly lower, leading to a poor user experience in the process of continuously using of the water tank and a longer user waiting time.

In order to solve the above problem, U.S. Pat. No. 7,726,511 reveals a water storage tank for a reverse osmosis filter system. A bag within the water storage tank divides the inner chamber within the tank into two chambers, wherein one chamber is a finished pure water chamber and the other is a squeezed water chamber in place of a compressed air chamber. When a user needs water, water at pressure is introduced into the water storage tank; and pure water is squeezed out of the tap because the bag is squeezed. Because of the stable water pressure of the squeezed water, a stable squeezed flow of finished water can be obtained. Although the invention solves the problem of unstable flow resulting from the reduction in the air pressure within a conventional water storage tank, the tank of the invention has a spherical shape, which is unfavorable to the integration design of small reverse osmosis water purifiers; at the same time, in the invention, some squeezed water remains within the tank when the finished water bag is filled up with water; and the squeezed water occupies the space of the tank; furthermore, in the process of squeezing the finished water, the bag may be distorted and thus the finished water cannot be squeezed out completely.

SUMMARY

In line of the above, the water storage tanks employed in the existing household reverse osmosis purifiers suffer from defects in the design. Therefore, the present invention is intended to provide an alternative water storage tank to solve the above problem.

According to one aspect of the present invention, a water storage tank is provided, comprising: a shell with an inner wall forming an inner chamber of the water storage tank, the water storage tank being provided with a water storage bag assembly, wherein the shell comprises a first channel connecting finished water into the water storage bag assembly and a second channel connecting squeezed water to a squeezed-water space between the water storage bag assembly and the inner wall of the shell, and the water storage bag assembly has an external surface area greater than or equal to a surface area of the inner wall of the shell; and a top cap, disposed at a top of the shell and the top cap having an inner wall forming a hollow top cap chamber, wherein the top cap comprises a third channel connected in communication with the first channel of the shell and a fourth channel connected in communication with the second channel of the shell, and both the third and the fourth channels are connected in communication with the top cap chamber, wherein the second channel of the shell is connected in communication with a flow guiding groove disposed on the shell surface and connected in communication with the squeezed-water space.

According to another aspect of the present invention, a household water purifier comprising the water storage tank as described above is provided.

The water storage tank according to the present invention is suitable for use in filter equipment, and particularly in a pure water system and a household water purifier.

DETAILED DESCRIPTION

In order to allow a person of skill in the art to better comprehend technical solutions of the present invention, the present invention is further described in detail below in combination with the accompanying drawings and particular embodiments.

Figure 1:
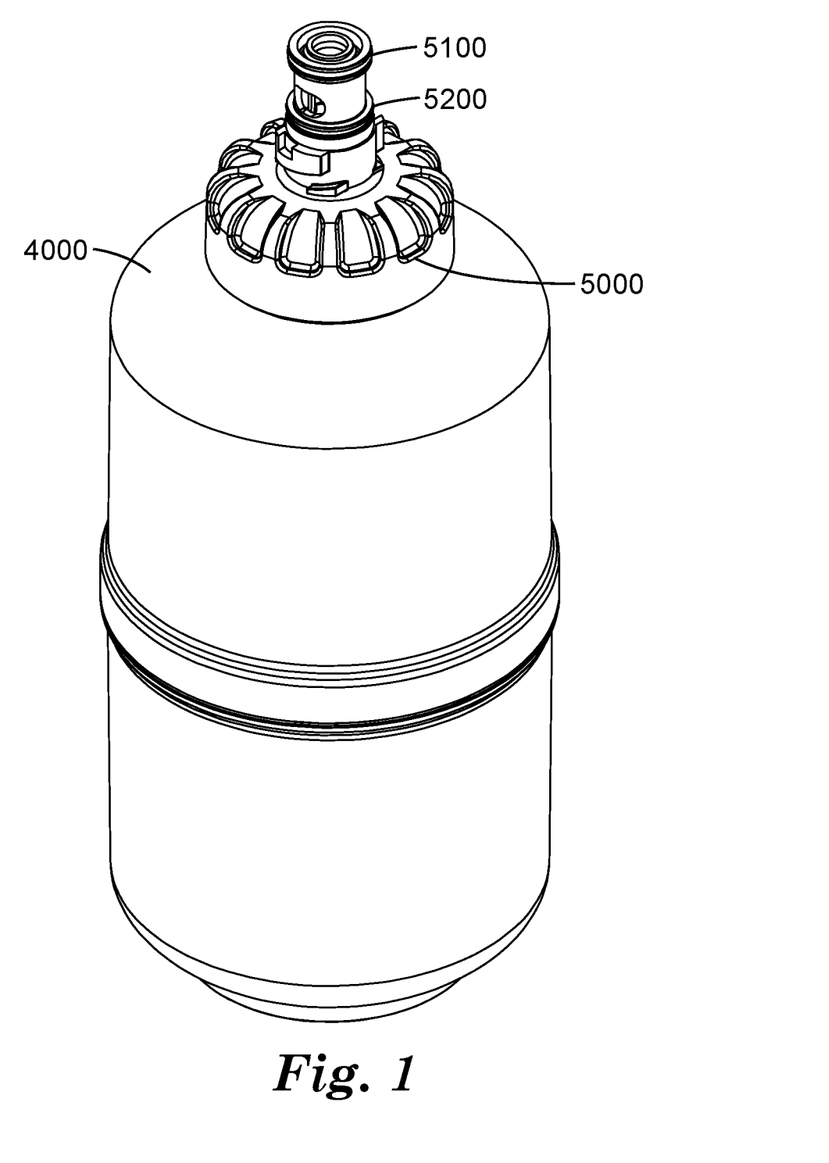
FIG. 1 is an overall schematic view of a water storage tank according to one particular embodiment of the present invention.
Figure 2:
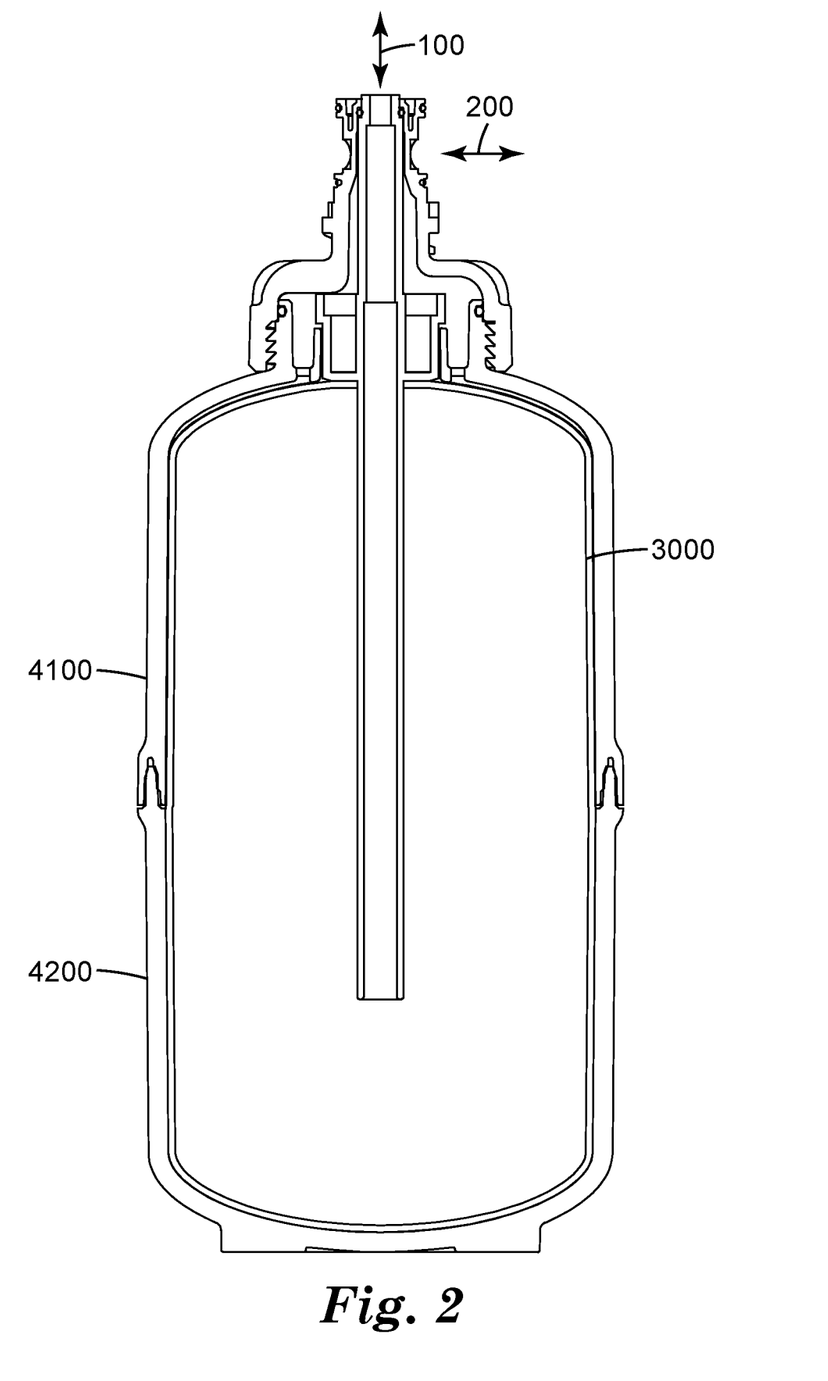
FIG. 2 is a schematic view of a vertical cross section of the water storage tank as shown in FIG. 1.

As shown in FIGS. 1 and 2, the water storage tank of this example is comprised of a shell 4000 of the water storage tank, a detachable top cap 5000, a water storage bag assembly 3000, and O-rings 5100 and 5200. The shell 4000 of the water storage tank has a cylindrical shape and is made of shell 4100 welded with shell 4200 or may be made by blow molding as a whole. The shell 4000 of the water storage tank may be made of high-molecular plastic or metal.

As shown in FIG. 2, the water storage tank is provided, near one end of the top cap, with two channels respectively connecting to finished water 100 and squeezed water 200.

Figure 3:
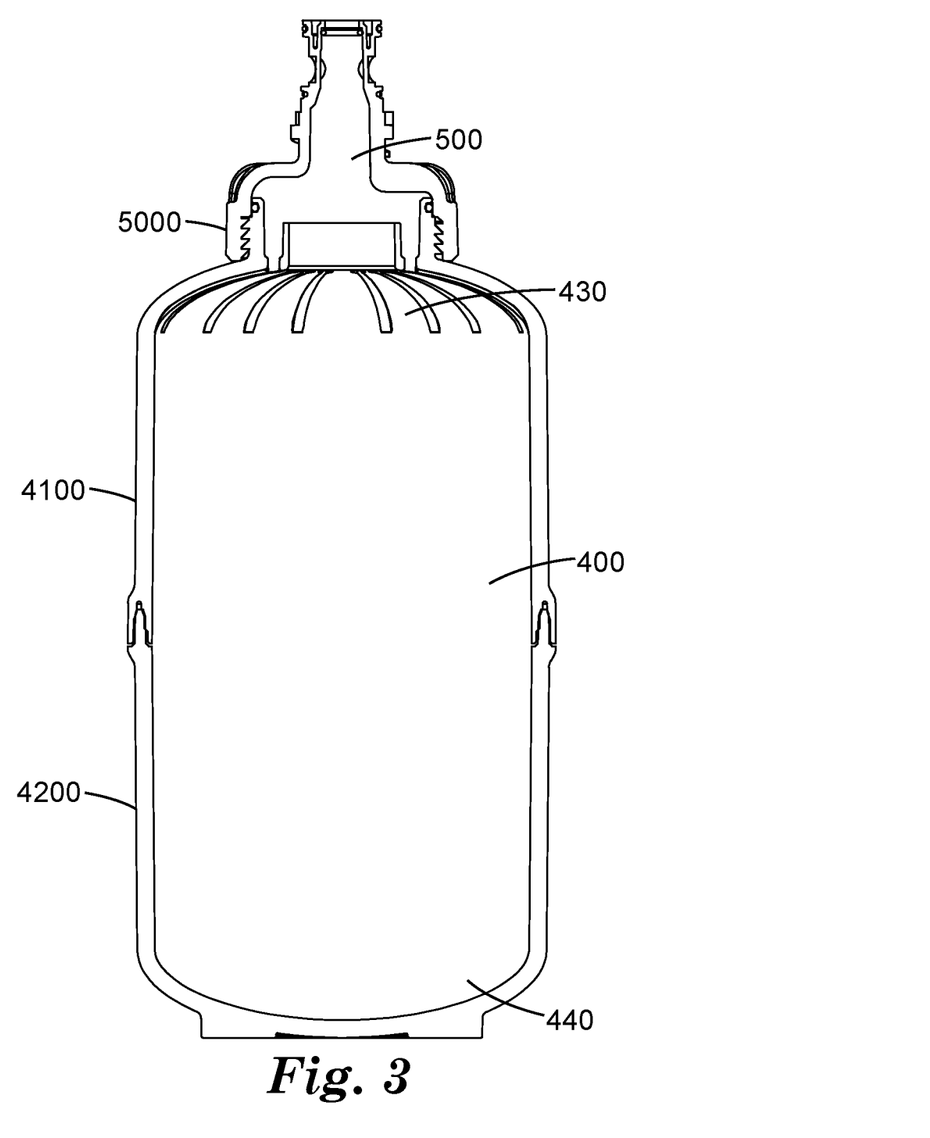
FIG. 3 is a schematic view of a vertical cross section of a cylindrical shell and a top cap area of the water storage tank as shown in FIG. 1.

FIG. 3 is a schematic view of a vertical cross section of a cylindrical shell and a top cap area of the water storage tank as shown in FIG. 1, wherein an inner chamber of the water storage tank is shown. As shown in FIG. 3, the inner chamber of the water storage tank comprises a water storage chamber 400, a top cap chamber 500, an upper chamber 430, and a lower chamber 440. The water storage chamber 400 has a cylindrical shape, and the upper chamber 430 and the lower chamber 440 have either an ellipsoidal or hemispherical shape. The top cap chamber 500 is connected in communication with the water storage chamber 400 through the upper chamber 430. The ellipsoidal or hemispherical design of the upper chamber 430 and the lower chamber 440 can disperse the stress resulting from water pressure borne by both ends of the inner chamber of the water storage tank, thereby improving the stress bearing performance of the water storage tank.

Figure 4:
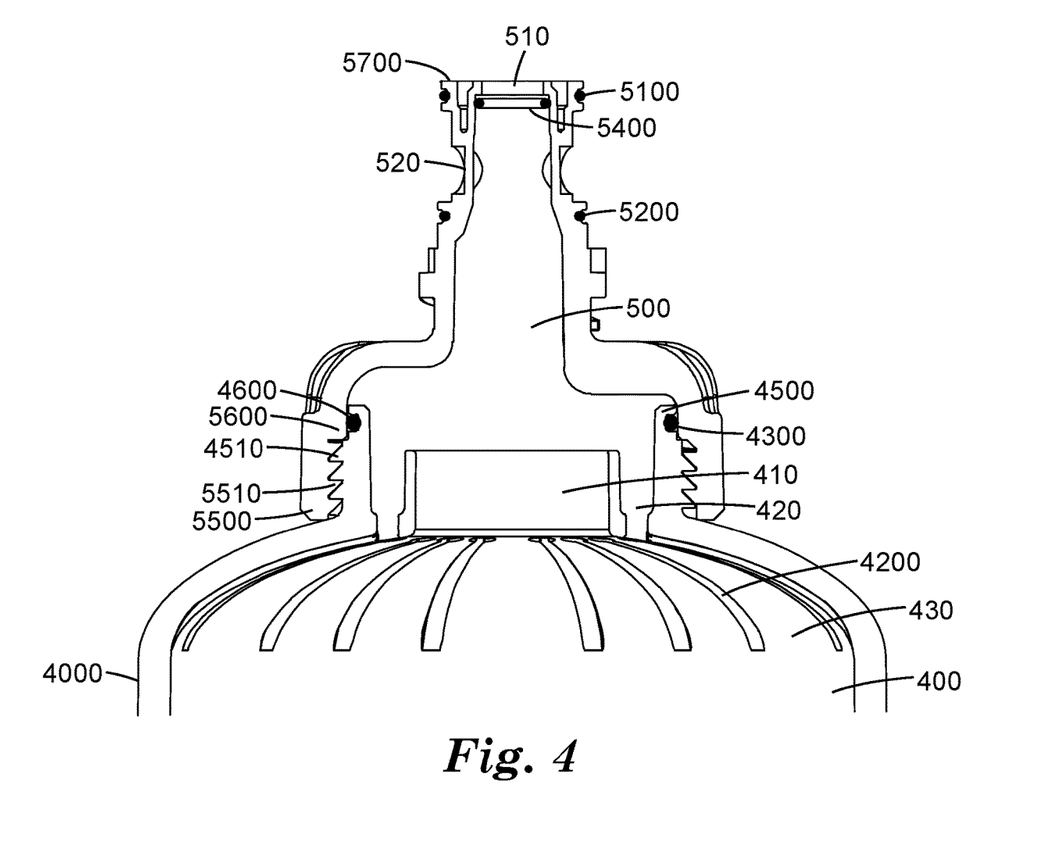
FIG. 4 is a schematic view of a vertical cross section of a top cap and an adjacent area thereof of the water storage tank as shown in FIG. 1.

FIG. 4 is a schematic view of a vertical cross section of a top cap and an adjacent area thereof of the water storage tank as shown in FIG. 1. As shown in FIG. 4, the outside of the upper chamber 430 of the shell 4000 of the water storage tank is provided with a flange 4500; the flange 4500 is provided on the external circumference thereof with an external thread 4510, a groove 4600, and an O-ring seal 4300. The O-ring seal 4300 is mounted within the groove 4600 of the flange 4500; and the flange groove 4600 is located between an outside edge of the flange 4500 and the external thread 4510; and the flange 4500 is coaxial with the cylinder of the water storage tank. The flange 4500 has two channels 410 and 420 therein, wherein the channel 410 is located in the central area of the flange chamber, and the channel 420 is distributed around the outside of the channel 410.

As shown in FIG. 4, the top cap 5000 has a combined cylindrical shape in a hollow form, and the hollow chamber is identified by 500. One end of the combined cylinder of the top cap 5000 adjacent to the upper chamber 430 is 5500; and the inner chamber thereof is provided with an internal thread 5510 and a smooth cylindrical surface 5600. The internal thread 5510 of the top cap 5000 and the external thread 4510 of the shell 4000 of the water storage tank have the same specification and match each other so as to enable mutual engagement and disengagement therebetween through relative rotation and movement, thereby facilitating fixation and disassembly of the top cap 5000. When the internal thread 5510 matches the external thread 4510 in a predetermined position, the ring seal 4300 is completely fixed by the chamber formed with the above flange groove 4600 and the cylindrical surface 5600 of the top cap, thereby sealing the top cap chamber 500 at the end face 5500.

Please still refer to FIG. 4. The other end 5700 of the top cap 5000 away from the upper chamber 430 is provided with two channels 510 and 520, wherein 510 is a finished water channel disposed in the central position of the top cap; 520 is a squeezed-water channel disposed in an external circumference area of the end face 5700; and both the two channels are connected in communication with the top cap chamber 500. An O-ring seal 5400 is disposed at the round inner side of the channel 510 and is configured to partition finished water 100 from squeezed water within the chamber 500; and O-ring seals 5100 and 5200 are disposed on the external circumference of the channel 520, wherein the O-ring seal 5100 is configured to partition finished water 100 from squeezed water 200 outside the tank body of the water storage tank; and the O-ring seal 5200 is configured to prevent squeezed water 200 from coming in contact with the outside world of the tank body of the water storage tank.

Figure 5:
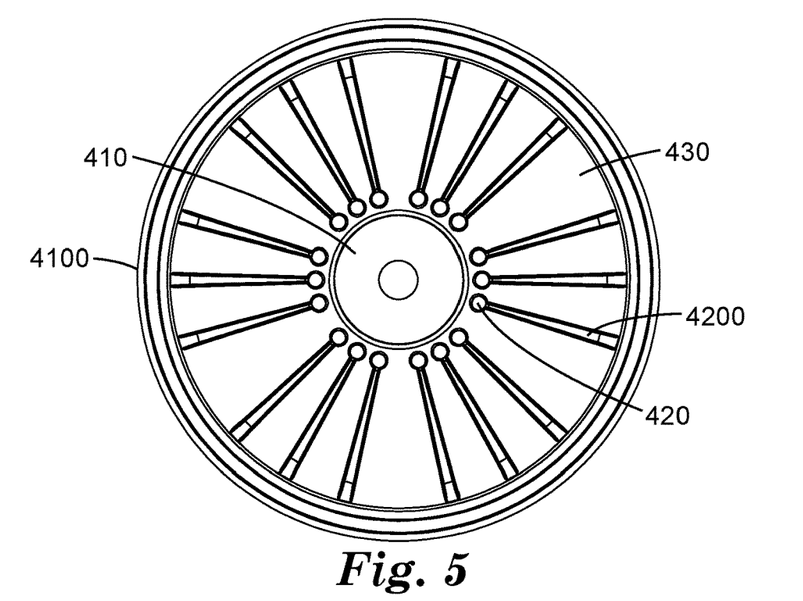
FIG. 5 is a schematic view of a squeezed water flow guiding groove of the water storage tank as shown in FIG. 1.

As shown in FIG. 4, both flange channels 410 and 420 can be connected in communication with the chamber 400 and the top cap chamber 500 of the water storage tank, wherein 410 is a finished water channel and 420 is a squeezed-water channel. As shown in FIG. 5, channel 420 is a group of round through holes distributed at the periphery of the channel 410 around the axial line of the chamber 400 of the water storage tank and connected in communication with the chamber 400 of the water storage tank through a surface of the upper chamber 430. Specifically, each round hole of the channel 420 is provided with a flow guiding groove 4200 on a surface contacting the upper chamber 430. As shown in FIG. 5, the flow guiding groove 4200 is distributed at the surface of the upper chamber 430 around the axial line of the chamber 400 of the water storage tank.

Figure 6:
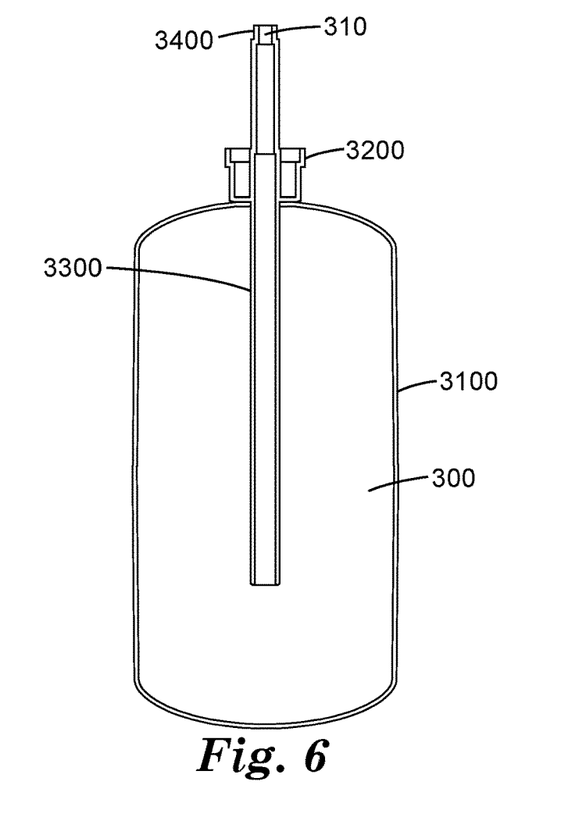
FIG. 6 is a schematic view of a vertical cross section of a water storage bag of the water storage tank as shown in FIG. 1.

FIG. 6 a schematic view of a vertical cross section of the water storage bag assembly 3000. As shown in FIG. 6, the combination 3000 comprises a film water storage bag 3100 and a joint 3200. The water storage bag 3100 can be made of a plastic or rubber film and is combined with the joint 3200 through a process such as adhesion or welding; and a water storage bag chamber 300 is formed and configured to store finished water 100. The joint 3200 is a hard member made of high-molecular plastic and is connected to the water storage bag 3100 to mount and seal the water storage bag 3100 to the top cap 5000 and the shell 4000. In this particular embodiment, the joint 3200 is hollow and is thus configured to provide a channel for finished water to flow in and out of water storage bag 3100. In another aspect, the water storage bag 300 is connected in communication with outer finished water 100 (e.g., finished pure water that has been treated by a reverse osmosis filtering system) through a central tube 3300 of the joint and the water inlet and outlet 3400 of the joint; and the inlet and outlet channel 310 for the outer finished water of the water storage tank is 310. Specifically, the water inlet and outlet 3400 of the joint is disposed on the central tube 3300 of the joint, and serves as a water inlet and outlet for finished water to flow in and out of channel 310 of the central tube 3300 of the joint and the water storage tank. Because the water storage bag may be distorted and deformed in the water-squeezing process, the chamber 300 may be divided into independent spaces that do not communicate with one another, leading to the possibility that a portion of finished water cannot be squeezed out fully. However, in a case where a central tube 3300 is disposed, the central tube 3300 is made of a hard material. Even if deformation occurs in the water storage bag 3100, the deformation happens around the central tube 3300, which can prevent the chamber 300 of the water storage bag from being divided into independent spaces that do not communicate with one another. In other words, the central tube 3300 can prevent distortion of the water storage bag, so as to ensure that all finished water is squeezed out completely from the chamber 300 of the water storage bag.

Figure 7:
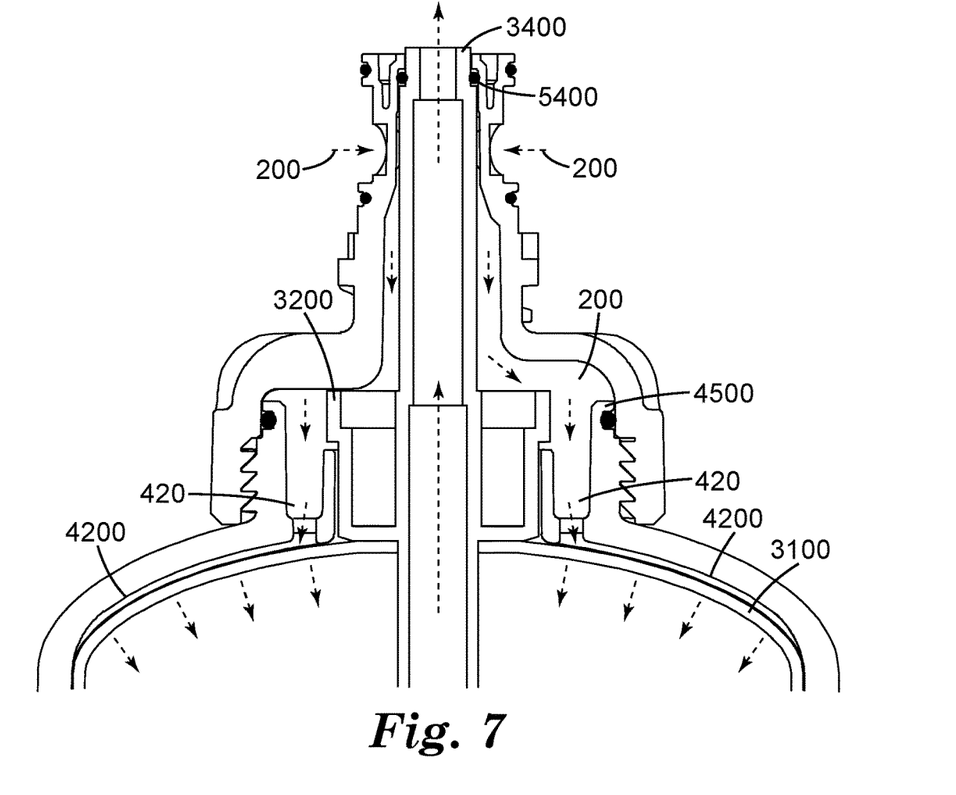
FIG. 7 is a schematic view of a vertical cross section of a top cap area of the water storage tank as shown in FIG. 1 in a water-squeezing state.

FIG. 7 is a schematic cross section of a water storage tank in a water-squeezing state. In this state, the joint 3200 of the water storage bag assembly 3000 is fixed within the flange 4500 of the tank by the top cap; the water inlet and outlet 3400 of the joint contacts the O-ring seal 5400; and the top cap chamber 500 is divided into two chambers that do not communicate with each other, i.e., inner and outer chambers of the joint of the water storage bag respectively; the inner chamber is a finished water 100 channel and the outer chamber is a squeezed water 200 channel.

In the state as shown in FIG. 7, the water storage bag 3100 is completely filled up with finished water. Because the water storage bag 3100 is designed to have a surface area greater than or equal to the surface area of the inner wall of the water storage chamber 400, it can be completely attached to the inner wall of the water storage chamber 400, thereby not allowing any squeezed water to remain within the tank; this also makes it possible to allow the space in the tank to be completely used for storing finished water 100. Specifically, in the upper chamber 430 area of the tank, the flow guiding groove 4200 still keeps an extremely small amount of squeezed water therein;

and these flow guiding grooves 4200 are connected in communication with the squeezed water channel 200 of the top cap chamber. When squeezed water 200 is driven by an external pressure, it enters from the channel 520 at the top cap of the water storage tank, to the round hole channel 420 for squeezed water along a channel formed by an outside area of the joint 3200 of the water storage bag and the inner side area of the top cap; squeezed water 200 then enters a space between the inner wall of the tank and the water storage bag 3100 along the flow guiding groove 4200 and begins to put a pressure on the water storage bag 3100 under the action of pressure, thereby forcing finished water within the water storage bag to flow out along the central tube 3300 and the water inlet and outlet 3400 of the joint. In the case that the pressure of squeezed water is stable, the output of finished water is also maintained at a stable flow.

Because the water storage bag 3100 is completely come in contact with the inner wall of the tank chamber 400, such a long-term contact therebetween may make it difficult for the water storage bag to be separated from the inner wall of the tank, making it difficult for squeezed water to rapidly enter a space between the water storage bag and the inner wall of the tank. This difficulty also prolongs the response time for outputting finished water from the water storage tank; a user would have to wait for a longer time before water flows out of the tank. The design of the flow guiding groove 4200 in the present invention resolves the above problem by facilitating the flow speed of squeezed water, which then enters the space between the water storage bag and the inner wall of the tank in a fast manner, thereby shortening the response time for outputting finished water from the water storage tank and waiting time for the user.

Figure 8:
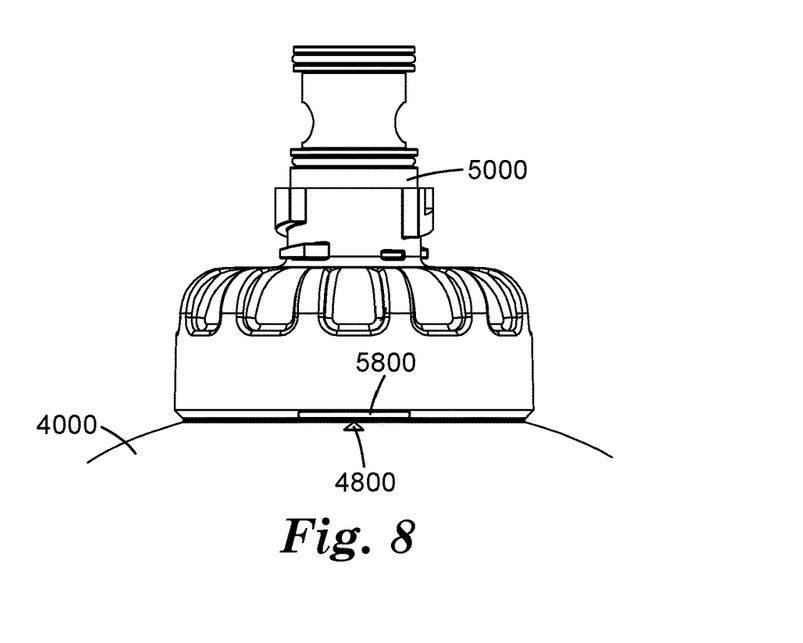
FIG. 8 is a schematic view of a position after a top cap of a water storage tank is mounted to the tank.

FIG. 8 is a schematic view of a position after a top cap 5000 of a water storage tank is mounted to the tank. As described above, a threaded connection is used between the top cap and the tank. Because the mounting position of the top cap cannot be controlled accurately in the process of rotationally mounting the top cap to the tank, the ring seal 4300 may be ineffective and water leakage will happen if the top cap fails to be mounted to the top cap accurately. For the convenience of mounting and positioning of the top cap, in the example shown in FIG. 8, positioning marks 5800 and 4800 are disposed on the top cap 5000 and the tank 4000. The mark 5800 is in a strip form, located on the top cap 5000 and distributed around the axis of the top cap, and has a certain angle range; and the mark 4800 is a triangle and located on the tank 4000, and points towards the mark 5800. In the final stage of mounting the top cap, the top cap will be indicated as being mounted in place as long as the mark 4800 points towards the strip range of the mark 5800. The design of positioning marks 5800 and 4800 facilitate an accurate mounting and positioning of the top cap and prevents water leakage resulting from improper mounting.

At the same time, in order to further validate feasibility of the present invention, a water storage tank according to the present invention meeting a certain size requirement was designed. Analysis of structural strength was performed thereon by a finite element simulation software to ensure the feasibility of the example of the water storage tank in engineering and the reliability thereof in the performance of structural strength. The cylindrical chamber of the inner chamber within the water storage tank has a diameter of about 130 mm and has chambers on both ends designed as ellipsoids; and the inner chamber has a total height of about 255 mm and a total volume of about 3 L; and the tank body of the water storage tank has a wall thickness of about 6 mm. In the analysis with the finite element simulation software, a modified polypropylene material is used for the water storage tank. The analysis results show that the water storage tank can withstand a water pressure exceeding 300 psi; and a common municipal water supply has a pressure of 20 to 60 psi, indicating that the strength of the water storage tank according to the present invention can sufficiently meet the application environment of household water purification.

In summary, the design of the water storage tank according to particular embodiments of the present invention improves the utilization rate of finished water storage space of the water storage tank; shortens the response time for outputting finished water from the water storage tank; provides a stable flow of water output. At the same time, the design of the water storage tank of the present invention also addresses the problem that some finished water cannot be completely squeezed out due to distortion of the water storage bag. Moreover, the embodiments employ a design of a cylindrical water storage tank with ellipsoidal or hemispherical ends; the structural strength of the tank is then ensured while the external diameter of the tank is reduced to facilitate the integration design of a water storage tank and a household reverse osmosis water purifier. Also, in the water storage tank according to the embodiments of the present invention, a design of the removable top cap and the ring seal makes replacement of the water storage bag more convenient, which also improves the reliability, the hygiene, and the convenience of the water storage tank.

It can be understood that the above particular embodiments are only exemplary embodiments employed for illustrating the principles of the present invention; the embodiments are not meant to be limiting the present invention. For those of ordinary skill in the art, various variations and modifications may be made without departing from the spirit and essence of the present invention. These variations and modifications shall also be considered as falling within the protection scope of the present invention.

The invention claimed is:

1. A water storage tank, comprising:
a shell with an inner wall forming an inner chamber of the water storage tank, the water storage tank being provided with a water storage bag assembly therein, wherein the shell comprises a first channel connecting finished water into the water storage bag assembly and a second channel connecting squeezed water to a squeezed-water space between the water storage bag assembly and the inner wall of the shell, and the water storage bag assembly has an external surface area greater than or equal to a surface area of the inner wall of the shell; and
a top cap, disposed at a top of the shell and the top cap having an inner wall forming a hollow top cap chamber, wherein the top cap comprises a third channel connected in communication with the first channel of the shell and a fourth channel connected in communication with the second channel of the shell, and both the third and the fourth channels are connected in communication with the top cap chamber, wherein
the second channel of the shell is connected in communication with a flow guiding groove disposed on the shell surface and connected in communication with the squeezed-water space.

2. The water storage tank according to claim 1, wherein the water storage bag assembly comprises a water storage bag made of a filmy material, a joint disposed at a top of the water storage bag and is coaxial with the water storage bag, and a hollow tube passing through the joint, wherein one end of the hollow tube is provided with a water inlet and outlet of the joint so as to connect in communication with the finished water, and the other end of the hollow tube extends into the water storage bag.

3. The water storage tank according to claim 2, wherein the inner chamber of the water storage tank comprises a cylindrical water storage chamber as well as ellipsoidal or hemispherical upper and lower chambers disposed at both sides of the water storage chamber, and the upper chamber is adjacent to the top cap chamber.

4. The water storage tank according to claim 3, wherein the top cap is detachable.

5. The water storage tank according to claim 4, wherein the top cap is provided with an internal thread on the inner wall adjacent to a first end of the upper chamber in a mounted state.

6. The water storage tank according to claim 5, wherein the third channel is disposed in a central position away from a second end of the upper chamber in the mounted state of the top cap, the fourth channel is disposed on an external circumference of the second end of the top cap, and a first O-ring seal is disposed on a circumference of the inner wall of the third channel for partitioning the finished water from the squeezed water in the top cap chamber, a second O-ring seal and a third O-ring seal are disposed on an external circumference of the fourth channel for partitioning the finished water from the squeezed water outside the tank and for preventing the squeezed water from coming in contact with the outside world of the tank respectively.

7. The water storage tank according to claim 6, wherein the shell further comprises: a flange disposed outside the upper chamber and is coaxial with the water storage chamber, wherein an external circumference of the flange is provided with an external thread matching the internal thread disposed on the inner wall of the first end of the top cap chamber, a groove located between the external thread and an outside edge of the flange, and a fourth O-ring seal disposed within the groove, and when the internal thread and the external thread match in a predetermined position, the fourth O-ring seal is completely fixed by a chamber formed with the groove and the top cap.

8. The water storage tank according to claim 7, wherein a flange chamber is formed within the flange, the first channel is located in a central area of the flange chamber, and the second channel is distributed around the outside of the first channel.

9. The water storage tank according to claim 8, wherein the second channel is a group of round holes distributed at the peripheral of the first channel, around the axial line of the water storage chamber, and the flow guiding groove is distributed on the outer surface of the upper chamber, around the axial line of the water storage chamber.

10. The water storage tank according to claim 9, wherein in a water-squeezing state, the joint of the water storage bag assembly is fixed within the flange chamber with the top cap, and the water inlet and outlet of the joint contacts the first O-ring seal, so as to divide the top cap chamber into an inner chamber of the joint of the water storage bag for the finished water to pass through and an outer chamber of the joint of the water storage bag for the squeezed water to pass through, wherein the inner chamber is not connected in communication with the outer chamber.

11. A household water purifier comprising the water storage tank according to claim 1.

12. The water storage tank according to claim 1 wherein the second channel is a group of round holes distributed at the peripheral of the first channel, around the axial line of the water storage chamber, and the flow guiding groove is distributed on the outer surface of the upper chamber, around the axial line of the water storage chamber.

* * * * *

UNITED STATES PATENT AND TRADEMARK OFFICE
CERTIFICATE OF CORRECTION

| | |
|---|---|
| PATENT NO. | : 10,932,548 B2 |
| APPLICATION NO. | : 16/476615 |
| DATED | : March 2, 2021 |
| INVENTOR(S) | : Biyong Qiu |

Page 1 of 1

It is certified that error appears in the above-identified patent and that said Letters Patent is hereby corrected as shown below:

In the Specification

Column 5,
Lines 34-39, delete "and these flow guiding grooves 4200 are connected in communication with the squeezed water channel 200 of the top cap chamber. When squeezed water 200 is driven by an external pressure, it enters from the channel 520 at the top cap of the water storage tank, to the round hole channel 420 for squeezed water along a channel formed by an outside area of the joint 3200 of the water storage bag and the inner side area of the top cap; squeezed water 200 then enters a space between the inner wall of the tank and the water storage bag 3100 along the flow guiding groove 4200 and begins to put a pressure on the water storage bag 3100 under the action of pressure, thereby forcing finished water within the water storage bag to flow out along the central tube 3300 and the water inlet and outlet 3400 of the joint. In the case that the pressure of squeezed water is stable, the output of finished water is also maintained at a stable flow." and insert the same on Column 5, Line 33, as a continuation of the same paragraph.

Signed and Sealed this
Twenty-seventh Day of June, 2023

Katherine Kelly Vidal
*Director of the United States Patent and Trademark Office*